United States Patent [19]
Dray

[11] 3,788,612

[45] Jan. 29, 1974

[54] MIXING ELEMENT FOR EXTRUDER SCREW

[75] Inventor: Robert F. Dray, New Castle, Pa.

[73] Assignee: Feed Screws, Inc., New Castle, Pa.

[22] Filed: Sept. 15, 1972

[21] Appl. No.: 289,486

[52] U.S. Cl.................. 259/182, 259/191, 425/208
[51] Int. Cl............................................. B01f 7/08
[58] Field of Search ... 259/182, 183, 191, 192, 193, 259/9, 10; 425/205, 208, 209, 200; 198/213, 214, 215

[56] References Cited
UNITED STATES PATENTS

| | | | |
|---|---|---|---|
| 2,765,491 | 10/1956 | Magerkurth | 259/193 |
| 3,006,029 | 10/1961 | Saxton | 259/191 |
| 3,221,369 | 12/1965 | Vesilind | 259/191 |
| 3,248,469 | 4/1966 | Kosinsky | 425/208 |
| 3,721,427 | 3/1973 | Upmeier | 259/191 |

*Primary Examiner*—Robert W. Jenkins
*Attorney, Agent, or Firm*—Yeager, Stein & Wettach

[57] ABSTRACT

In an extruder screw, a mixing element disposed between two sections of the screw. The mixing element includes a plurality of spaced apart flutes extending either longitudinally or helically of the mixing element. The flutes have a constant radius and constantly vary in depth along their length. Between each flute is a land which comprises the outer surface of the mixing element.

11 Claims, 8 Drawing Figures

PATENTED JAN 29 1974 3,788,612

MIXING ELEMENT FOR EXTRUDER SCREW

FIELD OF THE INVENTION

The present invention relates to an extrusion apparatus for thermoplastic resins or materials, and, in particular, to an improved extrusion screw assembly having an integral mixing element.

BACKGROUND OF THE INVENTION

Thermoplastic resins or materials such as polyethylene, polypropylene, polyvinyl chloride and copolymers thereof and the like are generally melted and mixed in a continuous process within a rotating screw-type extruder. Thermoplastic resin is normally charged to the extruder in the form of dry particles such as pellets or the like. By rotation of the screw within the extruder barrel, these particles are intimately forced together so that they become softened and mixed or plasticized into a homogenous viscous state. After leaving the extruder, the material flows as a highly viscous mass under pressure and is amenable to conventional forming or molding processes. However, to properly prepare the thermoplastic resin for such forming or molding processes, it is extremely important that the softened or melted pellets be sufficiently mixed with each other to form a homogenous product having uniform properties. This is particularly true, for example, where various colored pigments are added to obtain a uniform coloration of the product, or where two or more polymers or copolymers are to be blended to obtain an integral polymeric structure, or when various modifiers, extenders, or the like are to be added.

Various attempts have been made to improve the mixing capabilities of extruder screws by providing these screws with mixing sections or elements of various configurations. While these attempts have provided an improved quality of the extrudate, they have not achieved dispersive and/or distributive mixing of satisfactorily high and uniform levels. Illustrative of some of these prior art structures include U.S. Pat. Nos. 2,453,088, 2,765,490, 2,868,517, 3,006,029, 3,221,369, 3,411,179 and 3,486,192.

SUMMARY OF THE INVENTION

The present invention overcomes the disadvantages and difficulties inherent in prior art devices by providing a mixing element integral with the extruder screw and having a surface configuration for achieving high uniformity of mixing of the thermoplastic resin.

The present invention provides a mixing element disposed between first and second flighted sections of an extrusion screw and having a circular cross section. The mixing element has a plurality of spaced apart flutes extending either longitudinally or helically of the mixing element. The flutes are of constant radius and have a constantly varying depth along their lengths. Between the flutes are lands comprising the outer surface of the mixing element.

In one embodiment, the present invention provides flutes comprising first flutes communicating between and being of progressively diminishing depth from the first to the second flighted sections of the screw. In this embodiment, the outer surface of the mixing element may be either cylindrical or tapered from the first to the second flighted screw sections.

In another embodiment, the present invention further provides second flutes disposed between the first flutes and spaced apart therefrom. The second flutes commence at points on the lands of the mixing element and communicate with the second section of the screw. Preferably, the second flutes have a progressively increasing depth from the points on the lands to the second section of the screw.

Other advantages of the present invention will become apparent from a consideration of the following detailed description taken with the accompanying drawings.

BRIEF DESCRIPTION OF THE DRAWINGS

In the drawings, wherein like reference numerals denote corresponding parts in the several views.

DESCRIPTION OF THE PREFERRED EMBODIMENTS

Figure 1:
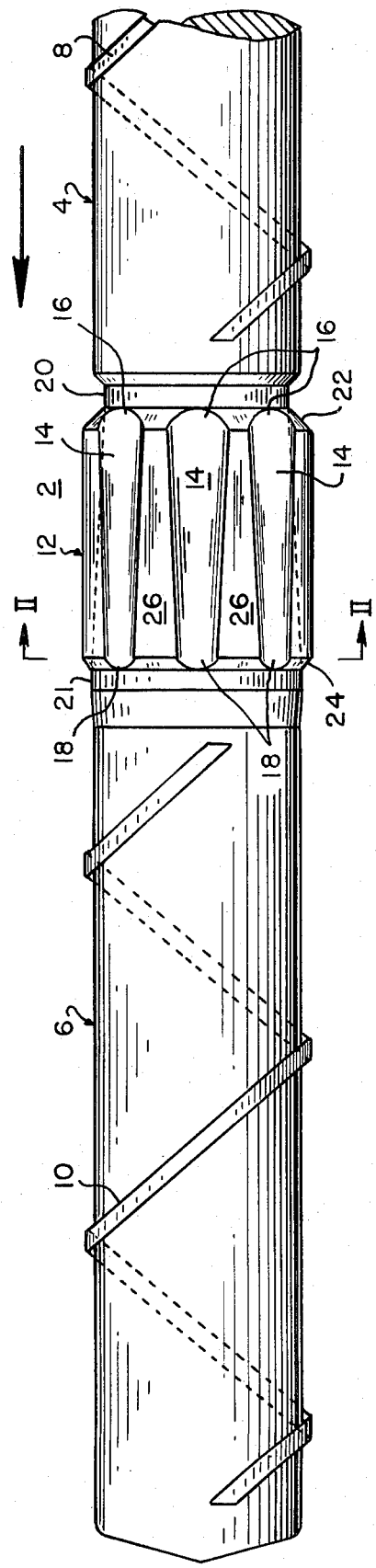
FIG. 1 is a side elevational of a portion of an extruder screw embodying an integral mixing element.

Referring to FIG. 1, the reference numeral 2 indicates generally an extrusion screw embodying the present invention. Screw 2 includes sections 4 and 6 having helical flight sets 8 and 10, respectively. Screw 2 is adapted for mounting and rotation within the barrel of a screw-type extruder (not shown) well known in the art. Preferably, the peripheral surfaces of the flights of each set 8 and 10 are portions of the surface of revolution of a right circular cylinder to provide a constant diameter throughout the length of each screw section 4 and 6. Moreover, it is preferred that the diameter of each set 8 and 10 be substantially similar. The distance between the surface of each flight and the inner surface of the extruder barrel is preferably constant, or it may be varied over the length of each screw section.

Intermediate of screw sections 4 and 6 and integral therewith is mixing element 12. The embodiment of the present invention illustrated in FIGS. 1 and 2 shows mixing element being of cylindrical configuration and, preferably, of a diameter substantially the same as screw sections 4 and 6 with their overflights.

Figure 2:
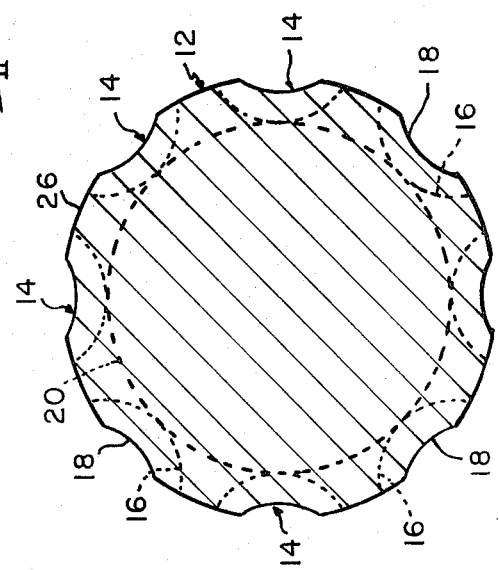
FIG. 2 is a sectional view of the mixing element of FIG. 1 taken along line II—II thereof.

Referring to FIGS. 1 and 2, mixing element 12 includes a plurality of spaced apart, preferably equidistant, flutes or fluted grooves 14 extending from the discharge end of screw section 4 to the inlet end of screw section 6. Flutes 14 are longitudinally arranged with respect to the longitudinal axis of screw 2. The radius of flute 14 is constant throughout its length; however, the inlet end 16 of each flute is deeper than the discharge end 18 of the flute and has a tangent point preferably coextensive with abutment land 20 between the nose of screw section 4 and mixing element 12 to provide a smooth flow of plasticized material from screw section 4 to flutes 14 (the direction of flow being indicated by the arrow). The discharge end 18 of flute 14 is shallow in comparison to the inlet end 16 and is preferably coextensive with the surface 21 at the inlet end of screw section 6. Preferably, mixing element 12 is beveled at its inlet end 22 and at its discharge end 24 to provide smooth transitional flow. Bevels 22 and 24 are coextensive with the depth of the flutes 14 at the respective ends.

Between each flute 14 is provided a land 26 which, in the embodiment of FIGS. 1 and 2, has an outer surface diameter equal to the diameter of the screw sections 4 and 6 and their overflights. Thus, the space between lands 26 and the inner surface of the extruder barrel (not shown) is approximately the same as the distance between the surface of the flights and the inner surface of said barrel.

Figure 3:
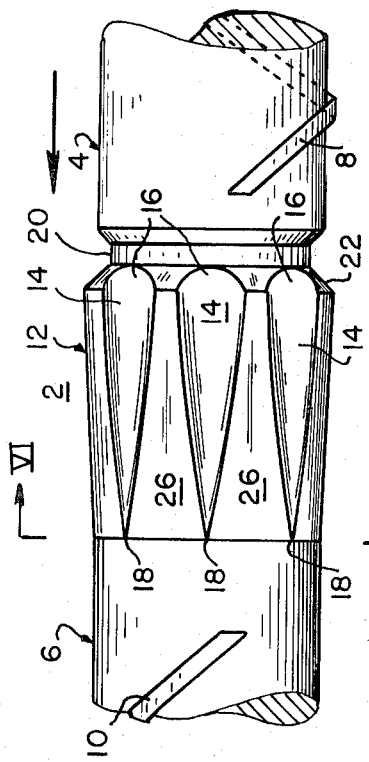
FIG. 3 is a side elevation of a portion of an extruder screw having an integral mixing element with two sets of flutes.
Figure 4:
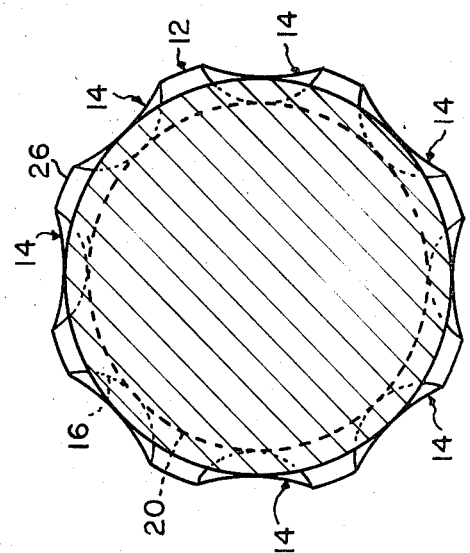
FIG. 4 is a sectional view of the mixing element of FIG. 3 taken along line IV—IV thereof.

The embodiment of the present invention shown in FIGS. 3 and 4 is similar to the embodiment of FIGS. 1 and 2 except for the addition of a plurality of spaced apart, preferably equidistant secondary flutes or fluted grooves 28. Flutes 28 commence at points on lands 26 and extend to the inlet end of screw section 6 longitudinally with respect to the longitudinal axis of screw 2. The radius of secondary flute 28 is constant throughout its length; however, the discharge end 30 of each flute 28 is deeper than the inlet end 32 of the flute 28 and is preferably coextensive with the surface 21 at the inlet end of screw section 6.

Figure 5:
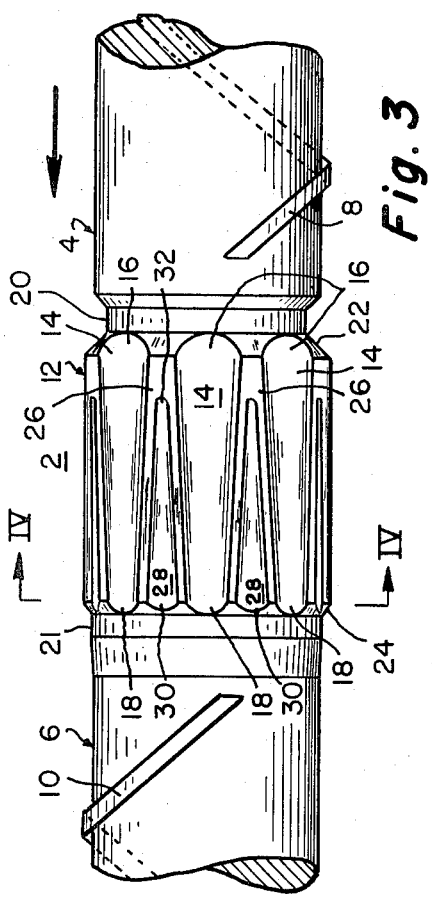
FIG. 5 is a side elevation of a portion of an extruder screw having an integral mixing element with a tapering outer surface.
Figure 6:
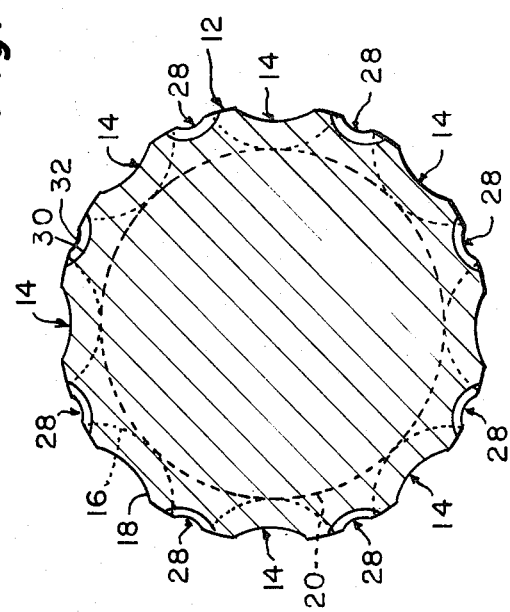
FIG. 6 is a sectional view of the mixing element of FIG. 5 taken along line VI—VI thereof.

The embodiment of the present invention shown in FIGS. 5 and 6 involves a mixing element 12 having an outer surface which tapers from the inlet end to the discharge end of mixing element 12. With the degree of taper shown in FIG. 5, the diameter of the mixing element 12 at its juncture with screw section 6 is substantially the same as the diameter of screw section 6 less its overflight; however, a lesser degree of taper may be used in which case mixing element 12 would be beveled at its discharge end in the manner previously described.

In the embodiment of FIGS. 5 and 6, flutes 14 are formed in the same manner as described for FIGS. 1 and 2 except the discharge ends 30 terminate at points on the surface of screw section 6. With a lesser degree of taper of mixing element 12, the termination of flutes 14 at their discharge ends 18 would be less pronounced.

Figure 8:
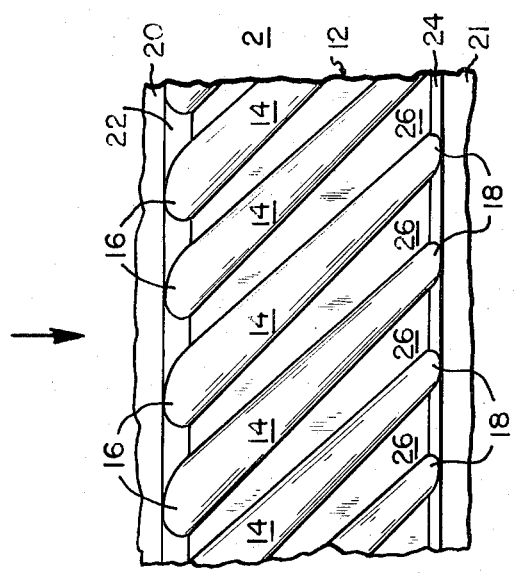
FIG. 8 is a development of a portion of the mixing element shown in FIG. 7.
Figure 7:
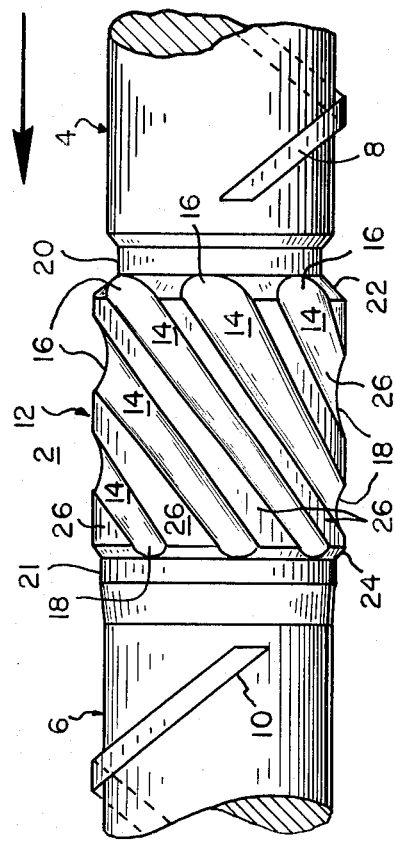
FIG. 7 is a side elevation of a portion of an extruder screw having an integral mixing element with helical flutes.

The embodiment of the present invention shown in FIGS. 7 and 8 is similar to the embodiment of FIGS. 1 and 2 except that the flutes 14 are arranged helically on mixing element 12. The angle of the helical flutes shown in FIGS. 7 and 8 is 45° but that angle may be varied as desired. Secondary flutes such as shown in FIGS. 3 and 4 may be helically arranged on this embodiment. Although the outer surface of mixing element 12 shown in FIGS. 7 and 8 is cylindrical, a tapered outer surface such as that shown in FIGS. 5 and 6 may be employed.

In operation, thermoplastic resin or material is fed to screw section 4 by means of a feeder or hopper (not shown). The thermoplastic material is then forcibly conveyed by means of helical flights 8 and discharged at the end of screw section 4 onto abutment land 20. The material is then forced through flutes 14 under pressure of the feed from screw section 4. As the material proceeds along the flutes it undergoes increased resistance because of the progressive shallowing of the flutes 14 from the inlet to the discharge end. Consequently, the material is forced out of the flutes 14 and onto the adjacent lands 26. As the plasticized material passes over lands 26, it is subjected to shear forces which provides the required mixing. Where secondary flutes 28 are employed, the material passing over lands 26 may enter flutes 28 and exit the mixing element 12 through the discharge ends 30 of flutes 28. The thermoplastic material, as integrally mixed, is discharged onto the surface of screw section 6 for further extrusion and feed.

An example of a preferred embodiment of the present invention is an extruder screw having a diameter of approximately 6 inches and of constant radius helical flights. Mixing element 12 may be of substantially the same diameter, i.e. 6 inches, and of a length of approximately 8 inches, although the outer surface of mixing element may taper to 5.5 inches at its discharge end if desired. Bevels 22 and 24 are set at a 45° angle, and flutes 14 are of a 1 inch radius. The radial depth from the diameter of the flutes at their inlet end is approximately 0.50 inch and at the discharge end 0.14 inch. When secondary flutes 28 are desired, they may have a radius of 0.5 to 1.0 inch, a radial depth of from 0 to 0.25–0.50 inch and be 4 to 6 inches in length.

While preferred embodiments of the present invention have been shown and described with particularity, it may otherwise be embodied within the scope of the appended claims.

What is claimed is:

1. In an extrusion screw, the improvement comprising a mixing element disposed between first and second flighted sections of said screw and having a circular cross section, said mixing element having a plurality of spaced apart flutes, said flutes being of constant radius and having a constantly varying depth from said first to said second flighted sections, and a plurality of lands between said flutes comprising the outer surface of said mixing element.

2. Apparatus as recited in claim 1 wherein:
said flutes extend longitudinally of said mixing element.

3. Apparatus as recited in claim 2 wherein:
said flutes comprise first flutes communicating between and being of progressively diminishing depth from said first to said second flighted sections of said screw.

4. Apparatus as recited in claim 3 wherein:
said flutes further comprise second flutes disposed between said first flutes and spaced apart therefrom, said second flutes commencing at points on said lands of said mixing element and communicating with said second flighted section of said screw and having a progressively increasing depth from said points to said second flighted section.

5. Apparatus as recited in claim 2 wherein:
said outer surface of said mixing element is cylindrical.

6. Apparatus as recited in claim 2 wherein:
said outer surface of said mixing element tapers from said first to said second flighted sections of said screw.

7. Apparatus as recited in claim 1 wherein:
said flutes extend helically of said mixing element.

8. Apparatus as recited in claim 7 wherein:

said flutes comprise first flutes communicating between and being of progressively diminishing depth from said first to said second flighted sections of said screw.

9. Apparatus as recited in claim 8 wherein:
said flutes further comprise second flutes disposed between said first flutes and spaced apart therefrom, said second flutes commencing at points on said lands of said mixing element and communicating with said second flighted section of said screw and having a progressively increasing depth from said points to said second flighted section.

10. Apparatus as recited in claim 7 wherein:
said outer surface of said mixing element is cylindrical.

11. Apparatus as recited in claim 7 wherein:
said outer surface of said mixing element tapers from said first to said second flighted sections of said screw.

* * * * *

UNITED STATES PATENT OFFICE
CERTIFICATE OF CORRECTION

Patent No. 3,788,612     Dated January 29, 1974

Inventor(s)   Robert F. Dray

It is certified that error appears in the above-identified patent and that said Letters Patent are hereby corrected as shown below:

Column 1, line 20, "homogenous" should read
--homogeneous--;

Column 1, line 27, "homogenous" should read
--homogeneous--;

Column 2, line 17, "elevational" should read
--elevation--.

Signed and sealed this 21st day of May 1974.

(SEAL)
Attest:

EDWARD M. FLETCHER, JR.
Attesting Officer

C. MARSHALL DANN
Commissioner of Patents